(12) United States Patent
Johnson et al.

(10) Patent No.: US 11,584,120 B2
(45) Date of Patent: Feb. 21, 2023

(54) UNIFORMITY COMPENSATION REFINEMENT MECHANISM

(71) Applicants: Scott R. Johnson, Boulder, CO (US); Ziling Zhang, Boulder, CO (US)

(72) Inventors: Scott R. Johnson, Boulder, CO (US); Ziling Zhang, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 17/196,161

(22) Filed: Mar. 9, 2021

(65) Prior Publication Data

US 2022/0288920 A1 Sep. 15, 2022

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ............................. B41J 2/0451; B41J 2/04586
See application file for complete search history.

(56) References Cited

U.S. PATENT DOCUMENTS

| | | | | |
|---|---|---|---|---|
| 6,030,066 | A | * | 2/2000 | Li .................... B41J 29/393 347/19 |
| 7,597,418 | B2 | | 10/2009 | Mantell et al. |
| 8,251,476 | B2 | | 8/2012 | Shin et al. |
| 8,414,102 | B2 | | 4/2013 | Viturro et al. |
| 8,743,396 | B2 | | 6/2014 | Bastani et al. |
| 9,381,763 | B2 | | 7/2016 | Rius Rossell |
| 9,700,908 | B2 | | 7/2017 | Baker et al. |
| 2007/0229559 | A1 | | 10/2007 | Oku et al. |
| 2016/0052318 | A1 | | 2/2016 | Humet Pous et al. |
| 2018/0234582 | A1 | | 8/2018 | Stanich et al. |
| 2018/0236776 | A1 | | 8/2018 | Stanich |

FOREIGN PATENT DOCUMENTS

| | | |
|---|---|---|
| EP | 0461810 B1 | 12/1991 |
| EP | 2202083 A1 | 6/2010 |
| GB | 2545727 A | 6/2017 |

OTHER PUBLICATIONS

Extended European Search Report for EP22160155.2, 11 pages, dated Jul. 20, 2022.

* cited by examiner

*Primary Examiner* — Thinh H Nguyen
(74) *Attorney, Agent, or Firm* — Jaffery Watson Mendonsa & Hamilton LLP

(57) ABSTRACT

A printing system is disclosed. The printing system includes at least one physical memory device to store uniformity compensation logic and one or more processors coupled with the at least one physical memory device to execute the uniformity compensation logic to receive print image measurement data corresponding with each of a plurality of pel forming elements, generate a first set of intermediate images based on the print image measurement data, determine whether historical sets of intermediate images are available, generate first transfer functions corresponding to each of the pel forming elements based on the first set of intermediate images and the historical sets of intermediate images upon a determination that the historical sets of intermediate images are available and transmit the first transfer functions for each of the pel forming elements.

20 Claims, 19 Drawing Sheets ized halftone bit map generated from calibrated halftones, or uncalibrated halftone bit map generated from uncalibrated halftones) for printing to the print medium 180.

UNIFORMITY COMPENSATION REFINEMENT MECHANISM

FIELD OF THE INVENTION

The invention relates to the field of image reproduction, and in particular, to uniformity correction.

BACKGROUND

When correcting cross-web spatial non-uniformity of printed images by a print engine with multiple fixed print heads, relatively large non-uniformities may occur due to nozzle response differences between the print heads and within a printhead. However, dynamic changes in jetting output (jet-out conditions) caused by defective nozzles provides challenges to generating quality uniformity corrections generated over multiple passes of uniformity correction data.

Accordingly, a mechanism to perform improved nozzle uniformity compensation is desired.

SUMMARY

In one embodiment, a printing system is disclosed. The printing system includes at least one physical memory device to store uniformity compensation logic and one or more processors coupled with at least one physical memory device to execute the uniformity compensation logic to receive first nozzle measurement data for each of a pel forming elements, identify a defect region in the first nozzle measurement data associated with one or more defective pel forming elements, generate a first jet out mask indicating the defect regions, replace the defect regions in the first nozzle measurement data with replacement data to generate first uniformity data and generate first uniformity compensation data based on the first uniformity data.

BRIEF DESCRIPTION OF THE DRAWINGS

A better understanding of the present invention can be obtained from the following detailed description in conjunction with the following drawings, in which.

DETAILED DESCRIPTION

A uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
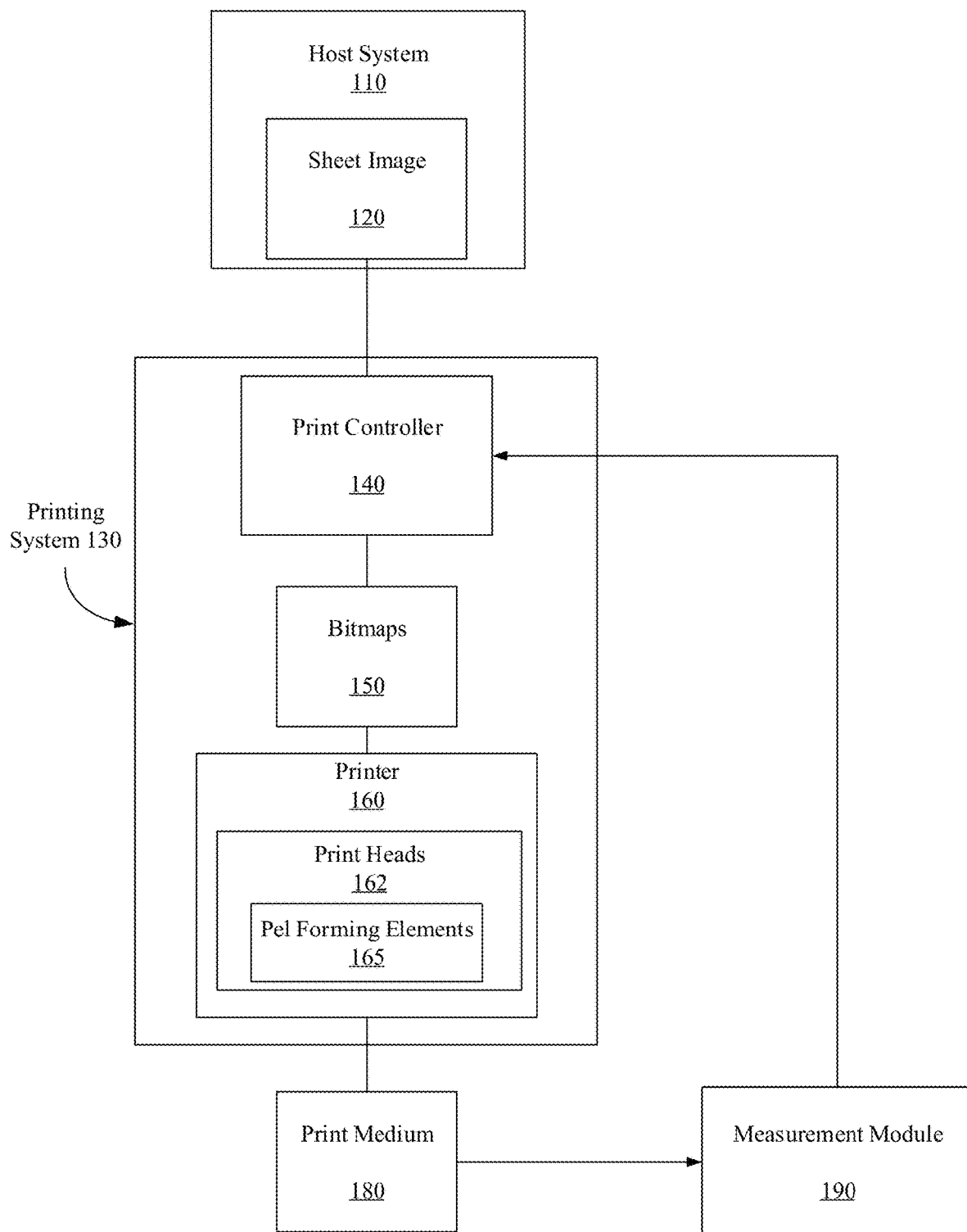
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle, nozzle, jet) and, in an electro-photographic (EP) printer the pel forming element may be a tangible device that determines the location of toner particles printed on the print medium (e.g., an EP exposure LED or an EP exposure laser).

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180.

The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a uniformity compensation system to obtain measurements of the printed medium 180. The measured results are communicated to print controller 140 to be used in the uniformity compensation process. The measurement system may be a stand-alone process or be integrated into the printing system 130.

According to one embodiment, measurement module 190 may be a sensor to take measurements of printed images on print medium 180. Measurement module 190 may generate and transmit print image measurement data. Print image measurement data may be color response (e.g., RGB, optical density, etc.) data corresponding to a printed image that is either raw or processed. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer. In a further embodiment, print image measurement data may include a map information to correlate portions (e.g., a pel or plurality of pels) of the print image data to the corresponding pel forming elements 165 that produced the portions of the printed images. In another embodiment, the correlation of the portions of the measurement data to the corresponding pel forming elements that contributed to the portions of the measurement data are based on the print instructions used to create the printed images.

Figure 2A:
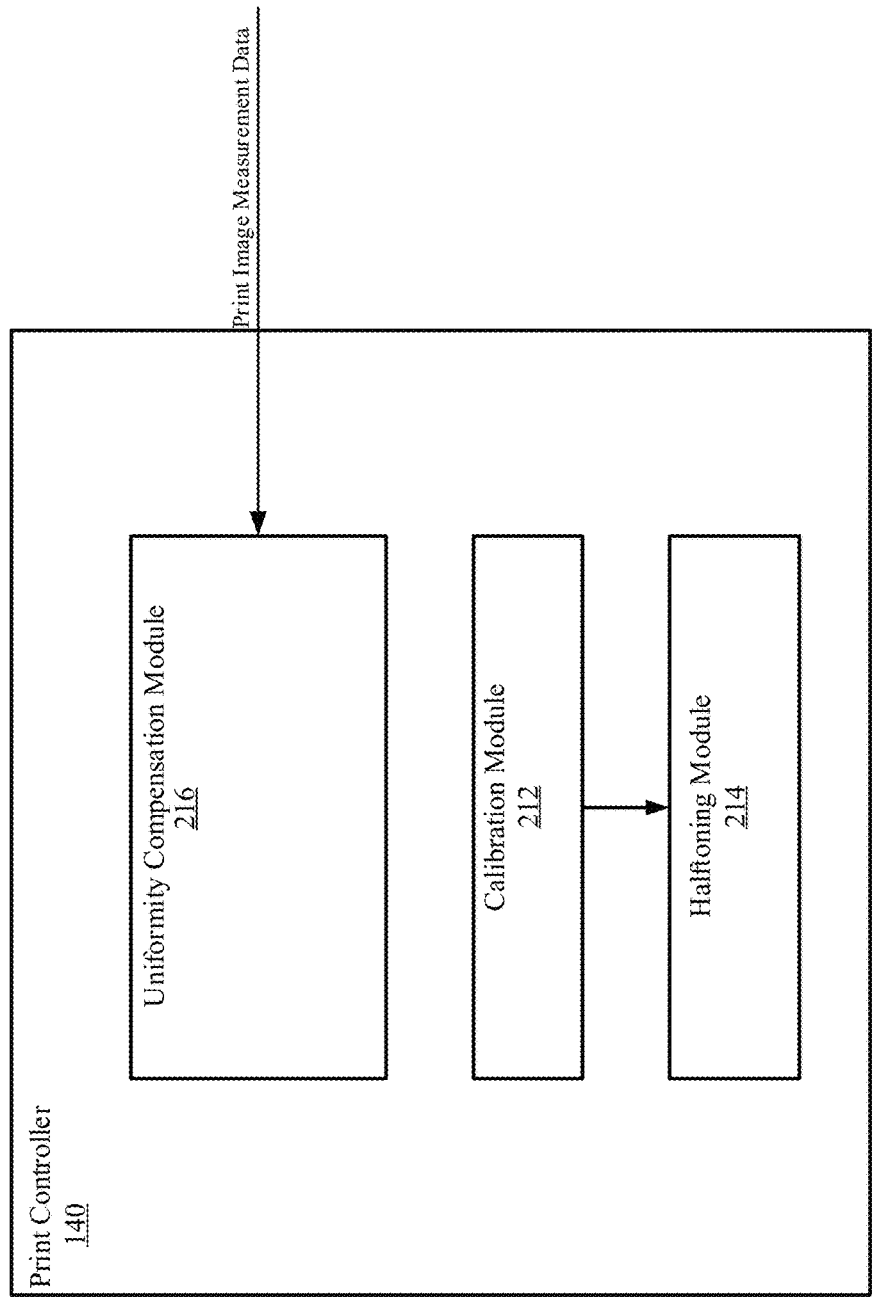
FIGS. 2A-2C illustrate block diagrams of embodiments of a print controller.
Figure 2B:
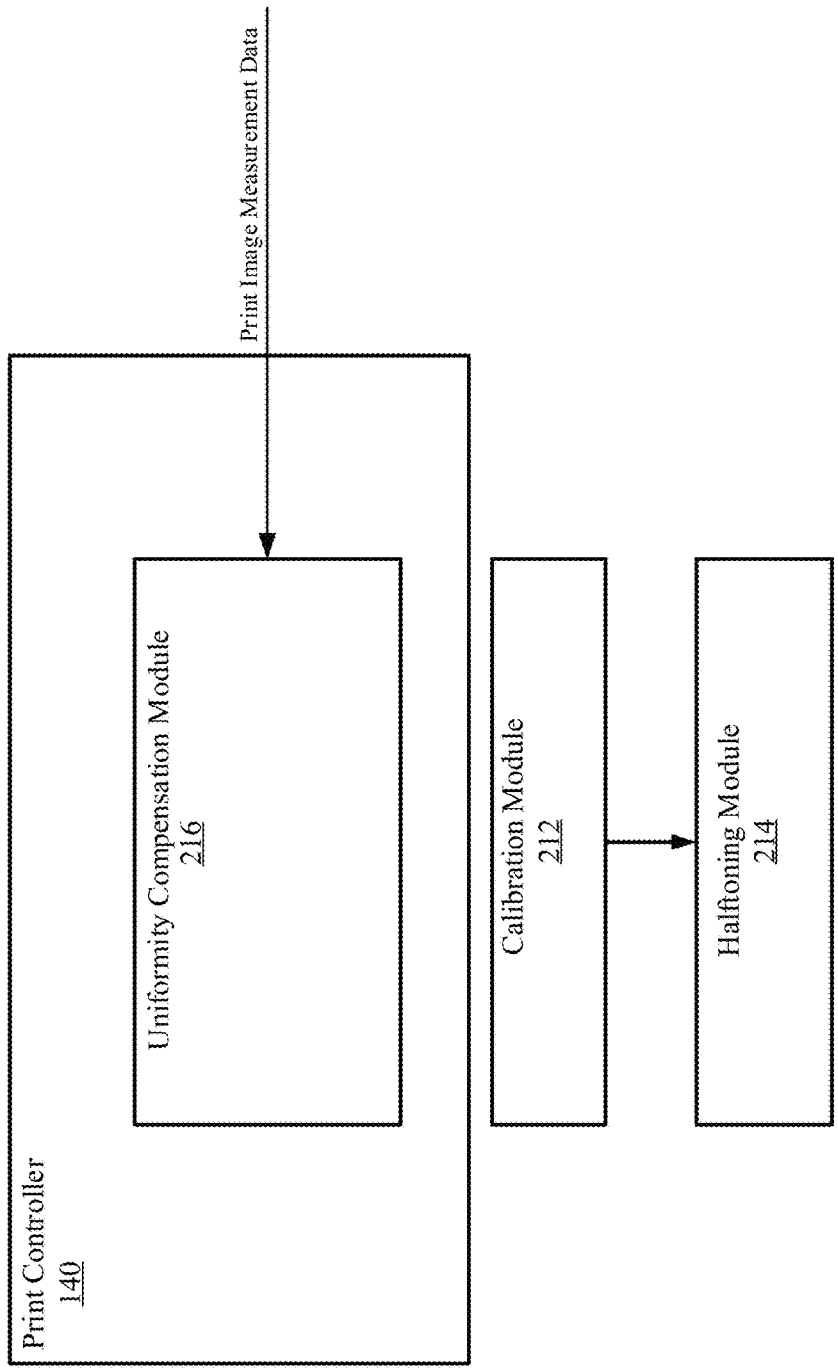

FIGS. 2A&2B illustrate embodiments implementing print controller 140. FIG. 2A illustrates a print controller 140 (e.g., DFE or digital front end), in its generalized form, including calibration module 212, a halftoning module 214, and a uniformity compensation module 216. FIG. 2B illustrates an embodiment in which print controller 140 includes uniformity compensation module 216, while calibration module 212 and halftoning module 214 are coupled externally. In either embodiment, the separate components may represent hardware used to implement the print controller 140. Alternatively, or additionally, the separate components may represent logical blocks implemented by executing software instructions in a processor of the printer controller 140.

Figure 2C:
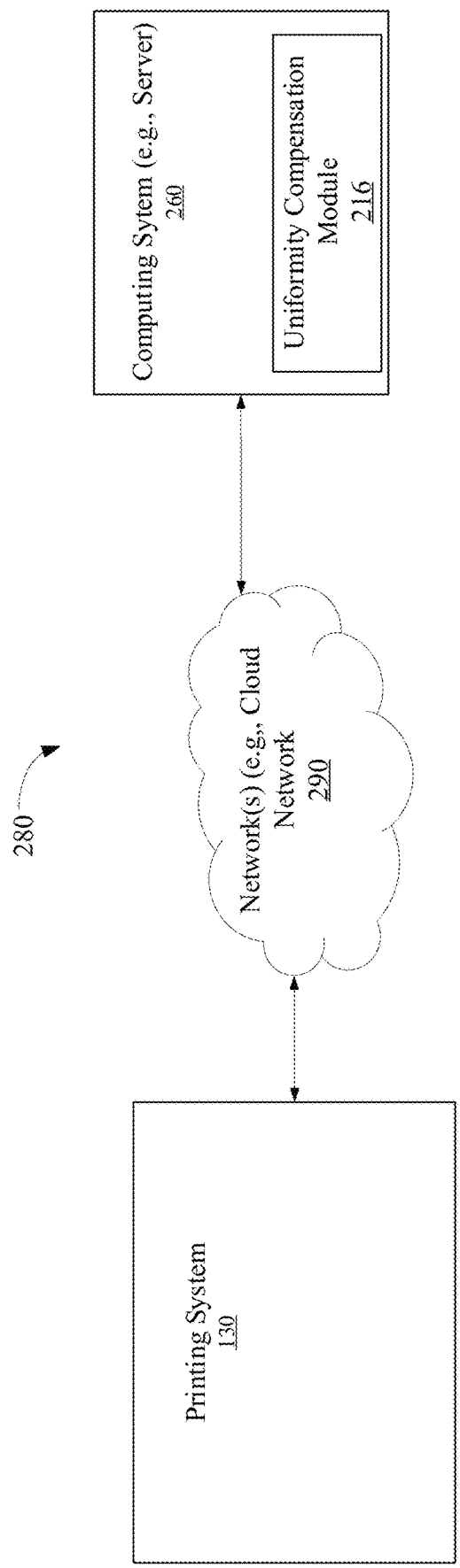

Although shown as a component within of print controller 140, other embodiments may feature uniformity compensation module 216 included in an independent device, or combination of devices, communicably coupled to print controller 140. For instance, FIG. 2C illustrates one embodiment of uniformity compensation module 216 implemented in a network 280. As shown in FIG. 2C, uniformity compensation module 216 is included within a computing system 260 and transmits data to printing system 130 via a cloud network 290

Halftoning module 214 is operable to represent the sheet-side bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

According to one embodiment, uniformity compensation module 216 uses jetting defect information to perform uniformity compensation. In such an embodiment, the defect information is combined with uniformity data to account for jetting defects in the generation of uniformity compensation data. In embodiments, uniformity compensation module 216 receives nozzle measurement data corresponding with each of a plurality of pel forming elements (or nozzles) and generates a jet out mask indicating defect regions in the nozzle measurement data associated with one or more defective pel forming elements.

In a further embodiment, uniformity compensation module 216 replaces the defect regions in the nozzle measurement data indicated in the jet out mask with replacement data to generate uniformity data and generates uniformity compensation data based on the uniformity data. Uniformity compensation module 216 may subsequently transmit the uniformity compensation data to the calibration module 212, where uniformity compensation to be applied by printer 160 in printing may be generated.

In yet a further embodiment, historical sets of uniformity data (e.g., data from previous uniformity compensation passes) may also be used to achieve uniformity compensation. In such an embodiment, historical sets of uniformity data may be stored in memory from capture events that occurred previously. As used herein, uniformity compensation is defined as a calibration to compensate for measured response differences versus a target response at a single pel, by a pel forming element 165 (e.g., print head nozzle (or nozzle)).

Figure 3:
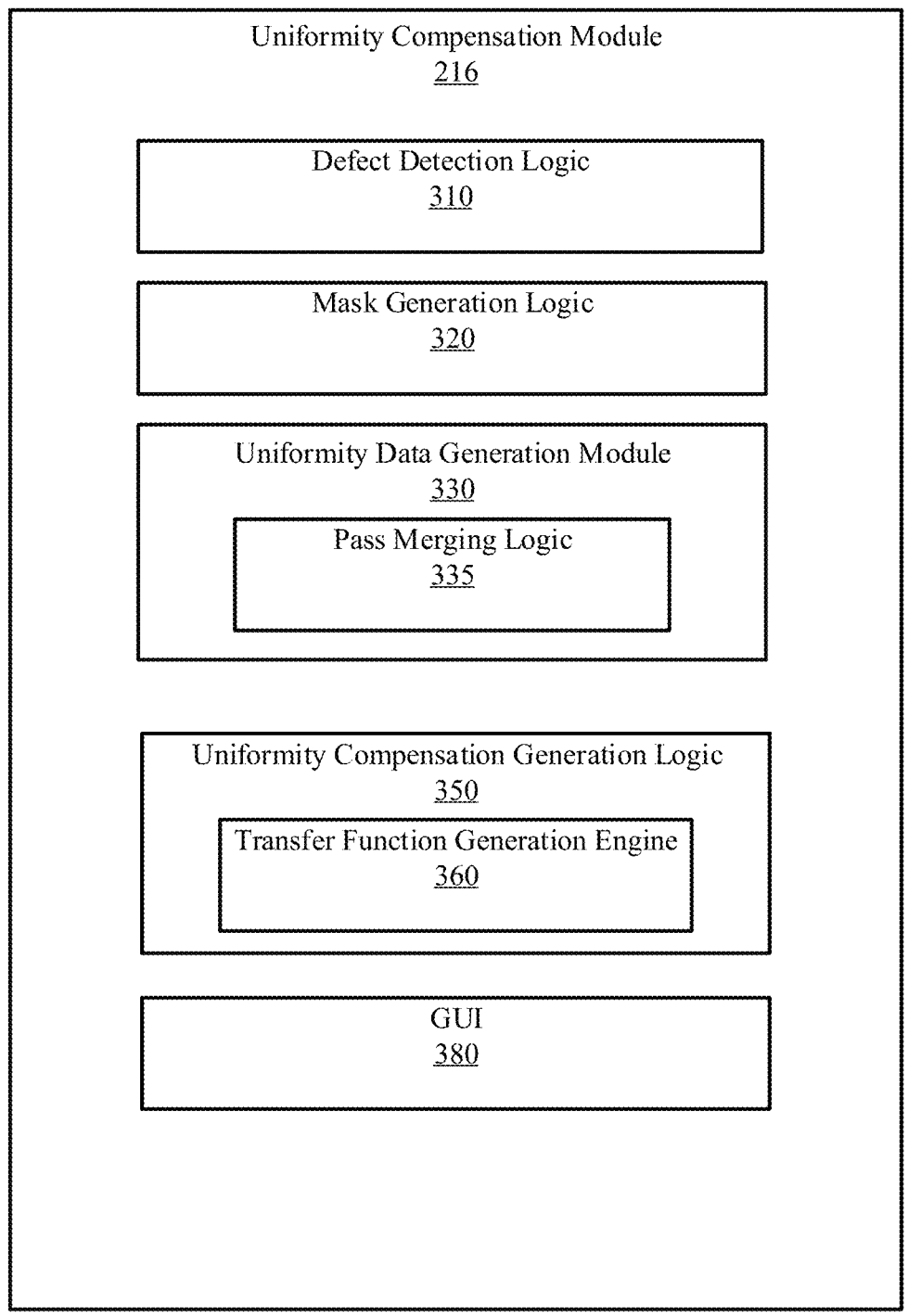
FIG. 3 illustrates one embodiment of uniformity compensation module.

FIG. 3 illustrates one embodiment of uniformity compensation module 216. As shown in FIG. 3, uniformity compensation module 216 includes defect detection logic 310. In one embodiment, defect detection logic 310 receives print image measurement data from measurement module 190 and analyzes pel forming element 165 jetting data (e.g., nozzle measurement data) included in the print image measurement data to identify one or more defective pel forming elements. In another embodiment, defect detection logic 310 receives defect region data that identifies the defect regions corresponding to the positions of one or more defective pel forming elements. The defective region data may be determined based on measured color response, nozzle firing sensors or other methods.

Figure 4A:
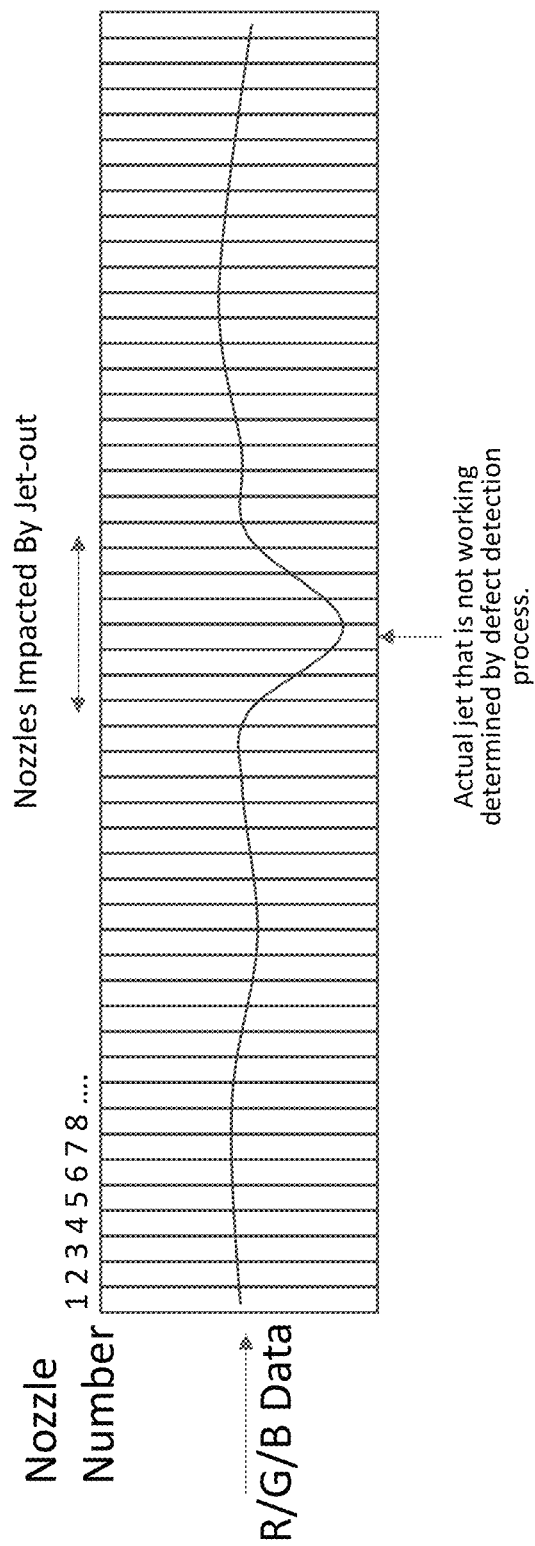
FIGS. 4A&4B illustrate embodiments of pel forming elements.
Figure 5:
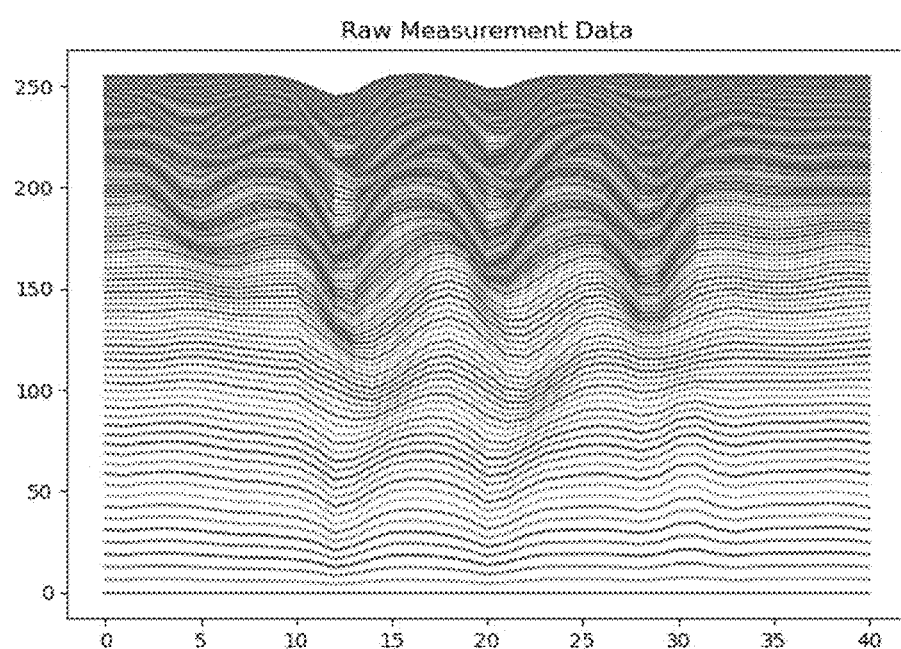
FIG. 5 illustrates one embodiment of nozzle measurement data.

FIG. 4A illustrates one embodiment of nozzle jetting data from a nozzle perspective, which identifies pel forming elements positions (e.g., nozzle positions) impacted by a defective pel forming element (e.g., nozzle), while FIG. 5 illustrates another embodiment of nozzle measurement data.

Figure 4B:
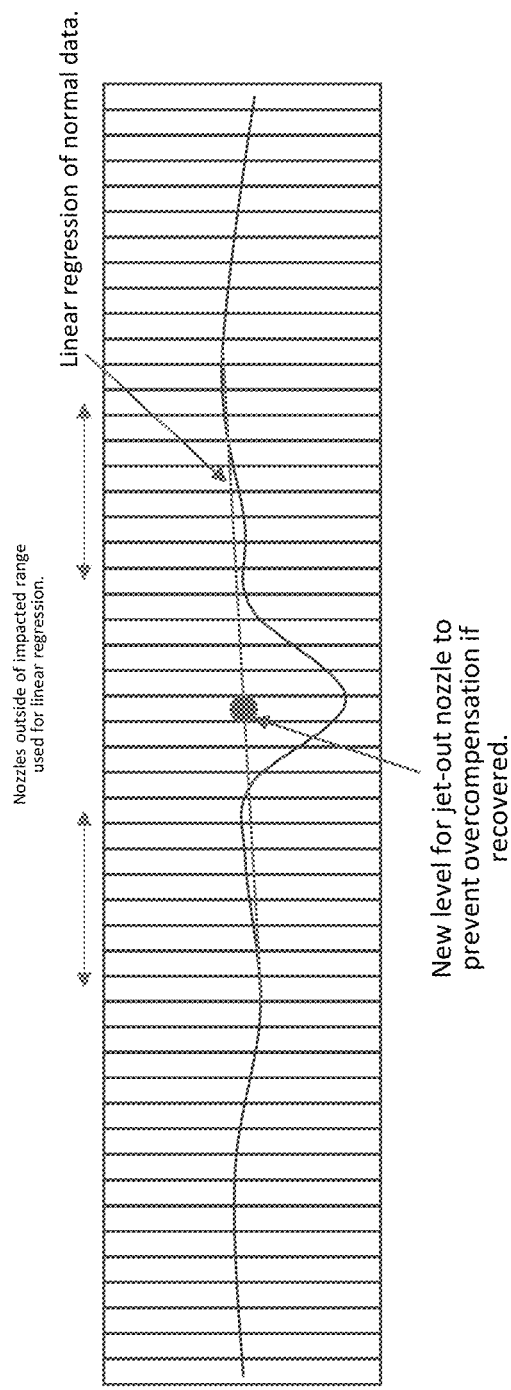

FIGS. 4A&4B and FIG. 5 represent the measured result of adjacent pel forming elements instructed to apply marking material at their respective positions. In FIGS. 4A&4B and FIG. 5, the vertical axis indicates color response and the horizontal axis indicates position (e.g., the positions of the corresponding nozzles across the print medium).

Figure 6A:
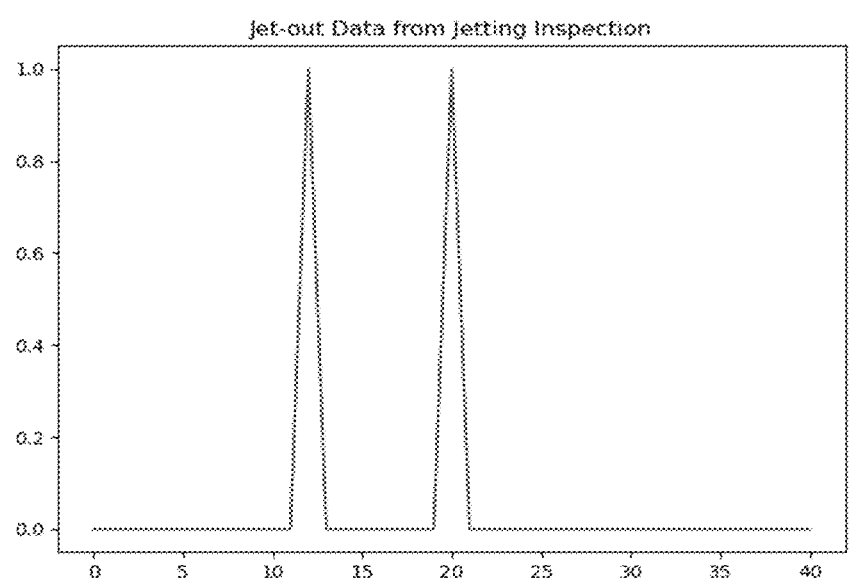
FIGS. 6A&6B illustrate embodiments of jet-out masks.

Uniformity compensation module 216 also includes mask generation logic 320 to generate a jet-out mask for defect regions in the nozzle measurement data associated with defective pel forming elements identified in the nozzle measurement data. In one embodiment, a jet-out mask compensates for (or masks) nozzle measurement data associated with a defective pel forming element. FIG. 6A illustrates one embodiment of a jet-out mask corresponding to the measurement data shown in FIG. 5.

Figure 6B:
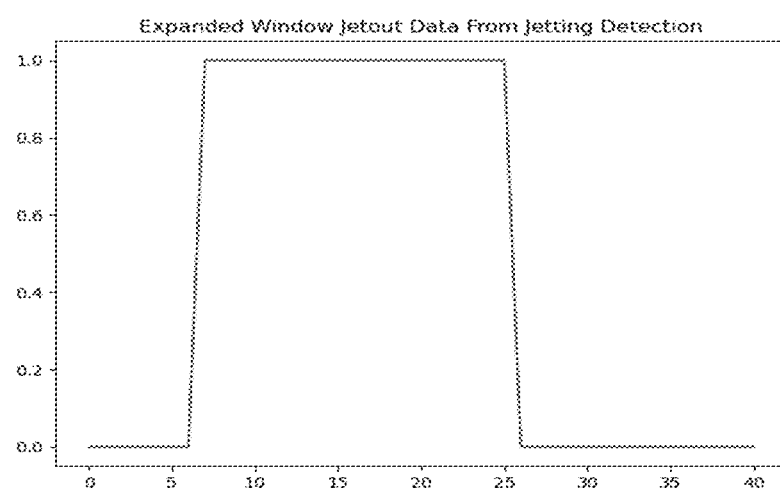

As shown in FIG. 6A, mask values of 0 are applied to data (e.g., color response data) associated with non-defective pel forming elements 165 (e.g., good data), while mask values of 1 indicate data from defective pel forming elements (e.g., defective data). However, since a single defective pel forming element may affect the printed response at the positions of neighboring pel forming elements, the jet-out mask may be expanded to include the neighboring pel forming elements. Thus, the jet-out mask is implemented to eliminate (or mask) the defective data included in the measurement data. FIG. 6B illustrates one embodiment of an expanded jet-out mask generated to also cover the neighboring pel forming elements of those shown as defective in FIG. 6A.

Uniformity compensation module 216 also includes uniformity data generation module 330 that is implemented to generate uniformity data. In one embodiment, uniformity data generation module 330 applies the generated jet-out masks to measurement data to generate uniformity data. In a further embodiment, uniformity data generation module 330 uses a jet-out mask to generate replacement data that is used to replace defect regions associated with the defective pel forming elements and neighboring pel forming elements indicated in the jet-out mask.

Figure 7A:
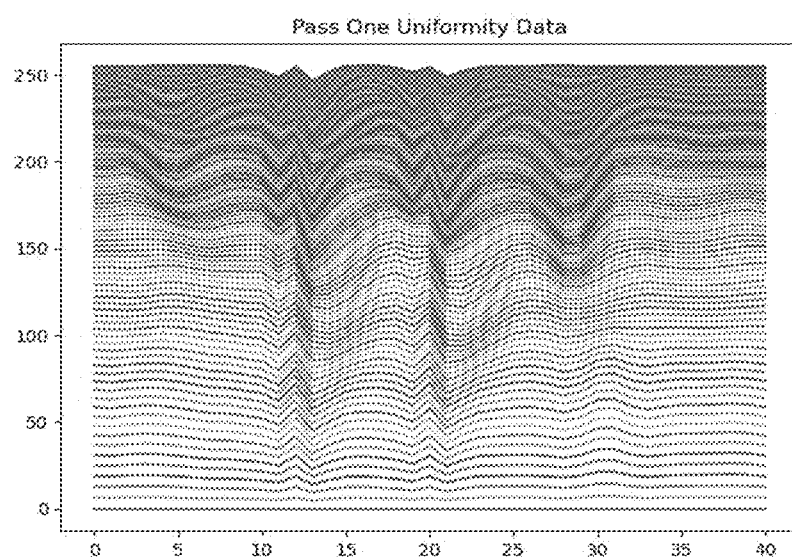
FIGS. 7A-7E illustrate embodiments of uniformity data.

According to one embodiment, the replacement data is generated by performing a linear interpolation using measurement data associated with the pel forming elements that are adjacent to the defective pel forming elements. In a further embodiment, the generated replacement data may be used for uniformity compensation of defective pel forming elements in instances in which the defective pel forming element recovers during printing. As a result, overcorrected dark streaks applied by the recovered pel forming elements are prevented. FIG. 4B illustrates one embodiment of the nozzle measurement data including the replacement data, while FIG. 7A illustrates an embodiment of uniformity data (e.g., after a first uniformity pass). In FIGS. 7A-7E, the vertical axis indicates color response and the horizontal axis indicates positions (e.g., the positions of the corresponding nozzles across the print medium).

Uniformity data generation module 330 also includes pass merging logic 335 that is implemented to merge historical sets of uniformity data from previous uniformity passes with uniformity data from a current pass. According to one embodiment, uniformity data generation module 330 determines whether historical sets of uniformity data are available to perform uniformity compensation. Upon a determination that the historical sets of uniformity data are not available, uniformity data generation module 330 uses only the current uniformity data to perform uniformity compensation.

Figure 7B:
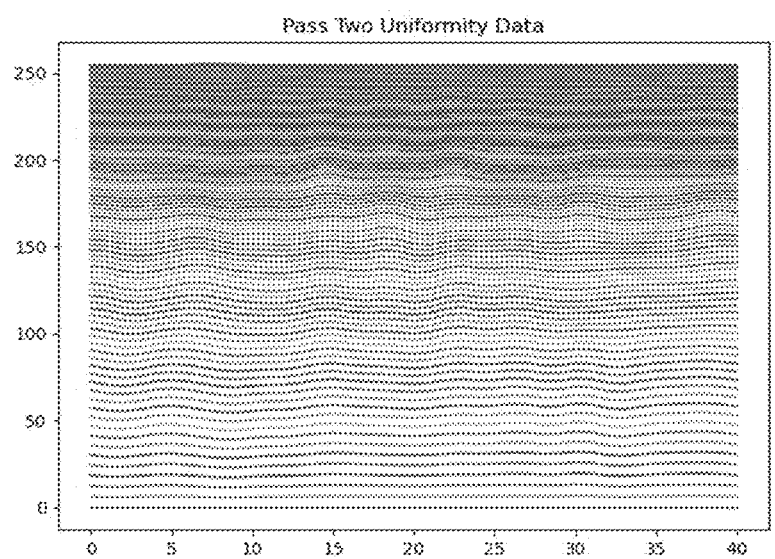

However, uniformity data generation module 330 uses the current uniformity data and the historical sets of uniformity data to perform uniformity compensation upon a determination that the historical sets of uniformity data are available. In such an embodiment, pass merging logic 335 merges the current uniformity data with one or more of the historical sets of uniformity data that may be selected by a user via graphical user interface (GUI) 380. Thus, current (e.g., second) nozzle measurement data may be received at uniformity compensation module and second uniformity data is generated, as described above, prior to merging with the historical sets of uniformity data. FIG. 7B illustrates an embodiment of uniformity data generated after a second uniformity pass.

According to one embodiment, pass merging logic 335 may perform an averaging of the current uniformity data and the historical sets of uniformity data to implement the merging. In this embodiment, weights are applied to jet-out masks associated with each set of historical uniformity data to generate a weighted mask. In a further embodiment, the weighted masks are applied to each set of historical uniformity data to eliminate the defective data from each previous pass. In a further embodiment, a weighting average (or pass weight) is applied to each set of uniformity data that is to be merged using the weighted mask as weighting factors.

In such an embodiment, the weighting factor may apply higher magnitude weighting to the more recent uniformity data and progressively lower magnitude weighting to the older uniformity data. FIG. 8A illustrates one embodiment of pass weights in which a higher weighting factor (e.g., 0.66) is applied to the second pass, while a lower weighting factor (e.g., 0.34) is applied to the first pass. In FIGS. 8A-8B, the vertical axis indicates color response and the horizontal axis indicates positions (e.g., the positions of the corresponding nozzles across the print medium). Further, FIG. 7C illustrates an embodiment of merged uniformity data generated after the weighting has been applied.

Figure 7C:
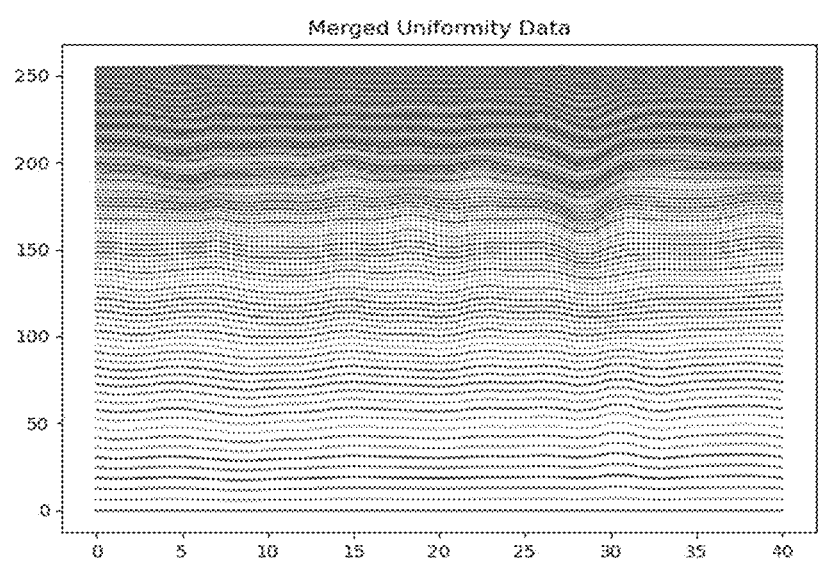
Figure 8A:
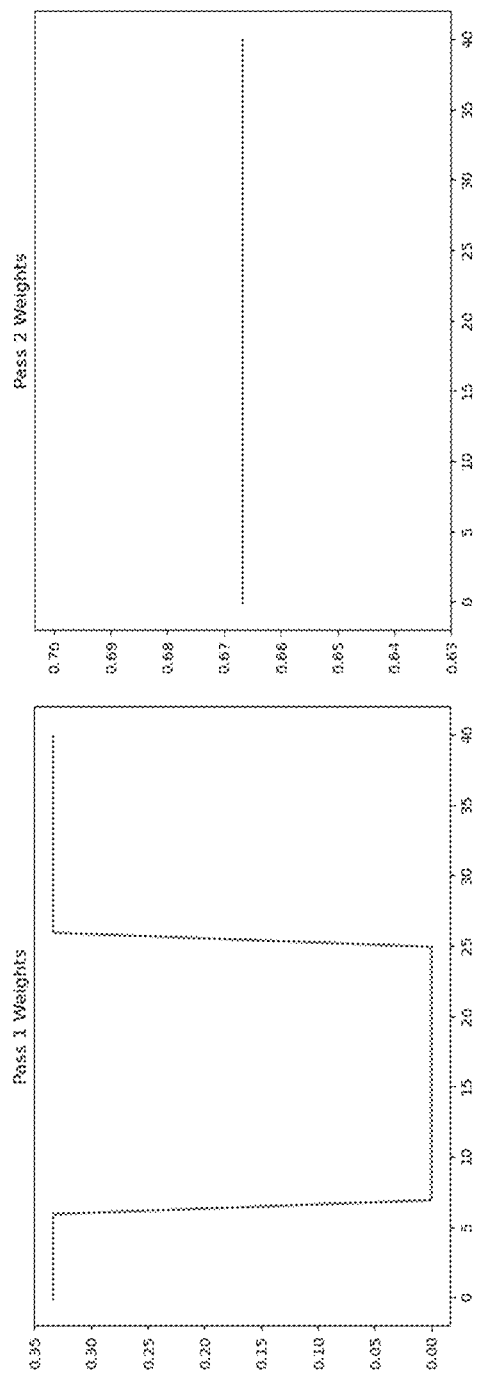
FIGS. 8A&8B illustrate embodiments of pass weights.
Figure 8B:
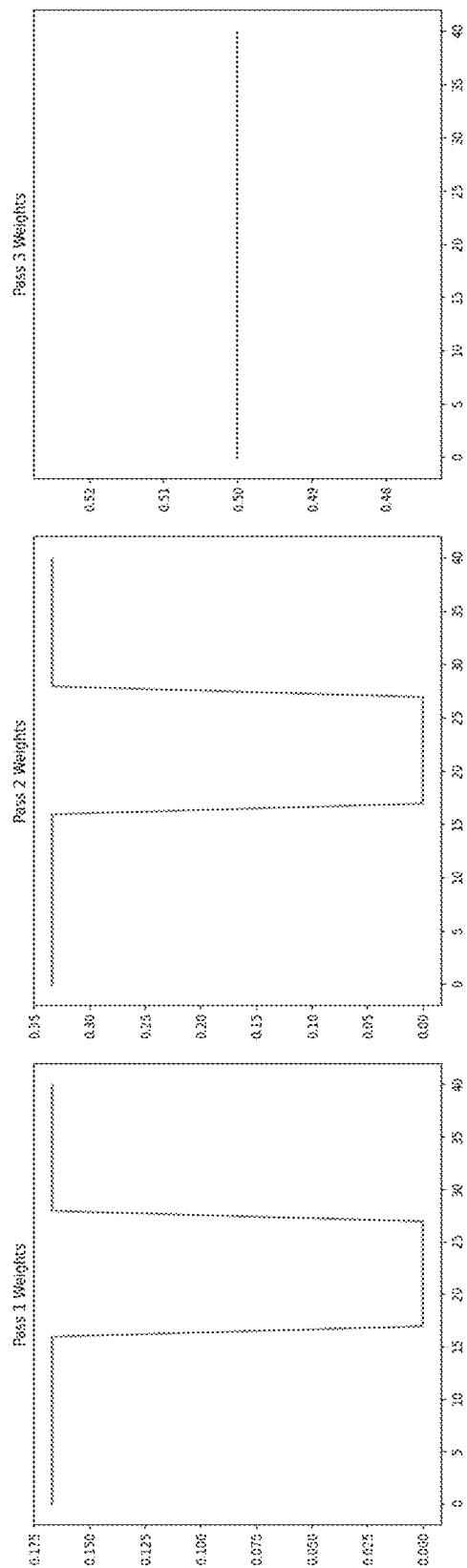

In the embodiment of merged data shown in FIG. 7C, the second pass of data detected zero defective pel forming elements. However, upon a determination that additional defective pel forming elements (e.g., defective pel forming elements different than those identified in the first pass) have been identified in the current nozzle measurement data, pass merging logic 335 generates one or more ignore masks used to eliminate data in the historical uniformity data associated with the additional defective pel forming elements.

Figure 7D:
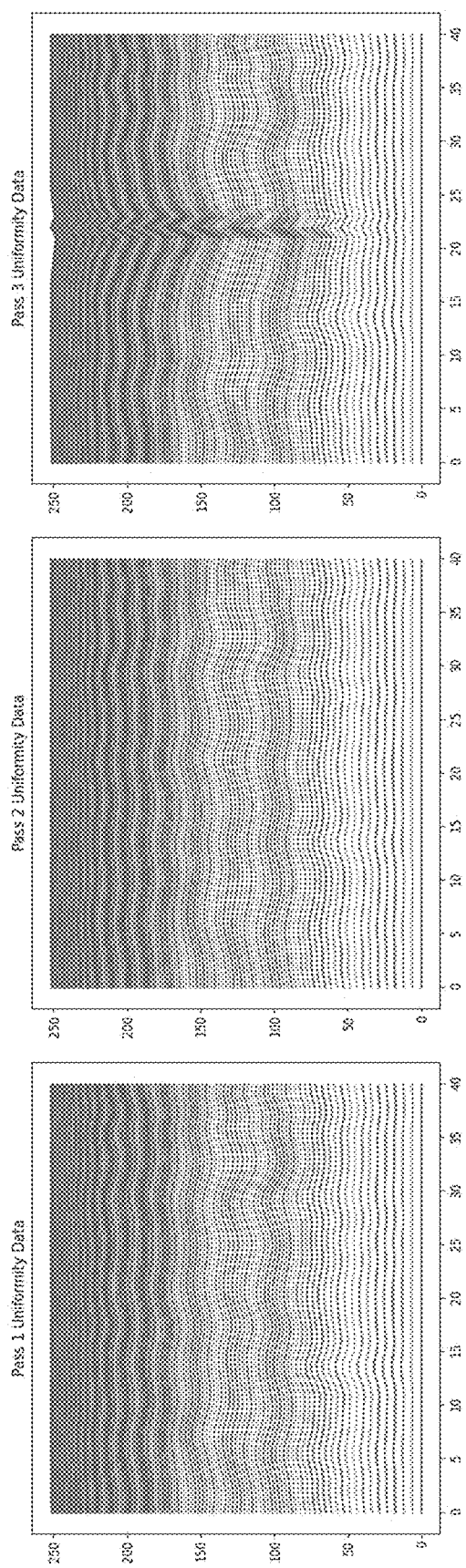
Figure 7E:
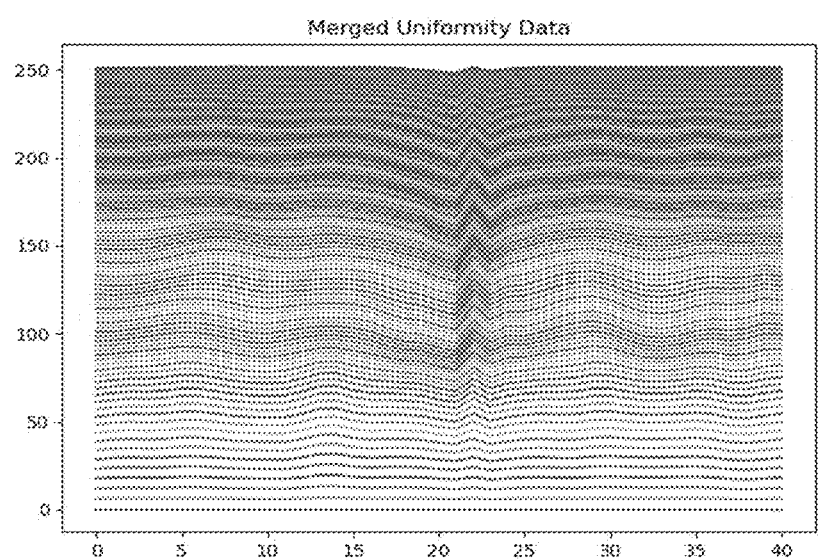

For example, FIG. 7D illustrates an embodiment of uniformity data generated for three passes. As shown in FIG. 7D, the third pass uniformity data comprises defective pel forming elements that were not present in the historical uniformity data in passes one and two. Thus, to generate the merged uniformity data, a weighted mask generated from a pass three jet-out mask is applied to the historical uniformity data to generate an ignore window. Subsequently, weighting factors are applied to generate the merged uniformity data. FIG. 8B illustrates one embodiment of pass weights that are applied pass one, pass two and pass three. Further, FIG. 7E illustrates an embodiment of merged uniformity data generated after the weighting has been applied.

Uniformity compensation generation logic 350 generates uniformity compensation data based on the generated uniformity data. In one embodiment, uniformity compensation generation logic 350 comprises transfer function generation engine 360, which generates a transfer function (or TF) or inverse transfer function (ITF) for each of the pel forming elements 165. In one embodiment, a transfer function comprises a mapping of an input digital count to an output digital count for a system, where digital count is the gray level or color value representing the pels in a bitmap 150 (FIG. 1).

Transfer functions are generated based on target color response (e.g., RGB value, optical density, reflected intensity, etc.) versus input digital count data and measured color response versus output digital count data). The transfer function represented as a continuous function may defined as g_output=TF(g_input), where g represents a color value. Further, the expression g_output=$M^{-1}$(T(g_input))=TF (g_input) represents the transfer function in terms of the target (T) and Inverse measured responses ($M^{-1}$). Thus, the Transfer Function TF($g_1$)=$g_2$. An inverse transfer function is the reversed (e.g., inverted) application of the transfer function, where the output digital count values of the transfer function form the input digital count values of the inverse transfer function and the input digital count values of the transfer function form the output digital count values of the inverse transfer function.

According to one embodiment, transfer function generation engine 360 generates transfer functions or inverse transfer functions corresponding to each of the pel forming elements 165 based on the current uniformity data and the historical sets of uniformity data when the historical sets of uniformity data are available, and generates transfer functions corresponding to each of the pel forming elements 165 based only on the current uniformity data when the historical sets of uniformity data are not available.

Once generated, the uniformity compensation data (e.g., transfer functions or inverse transfer functions) are transmitted for storage to be used to perform uniformity compensation. In one embodiment, uniformity compensation is performed by writing the transfer function data in a specific format that is compatible with the printer 160. As discussed above, uniformity compensation module 216 may transmit the uniformity compensation data to calibration module 212, where uniformity compensation to be applied by printer 160 in printing may be generated. In one embodiment, the generated transfer functions may be applied directly to image data. In another embodiment, thresholds in each column of the threshold array corresponding with the current halftone may be modified (e.g., modify the current halftones) using the generated inverse transfer functions for each respective pel forming element.

Figure 9:
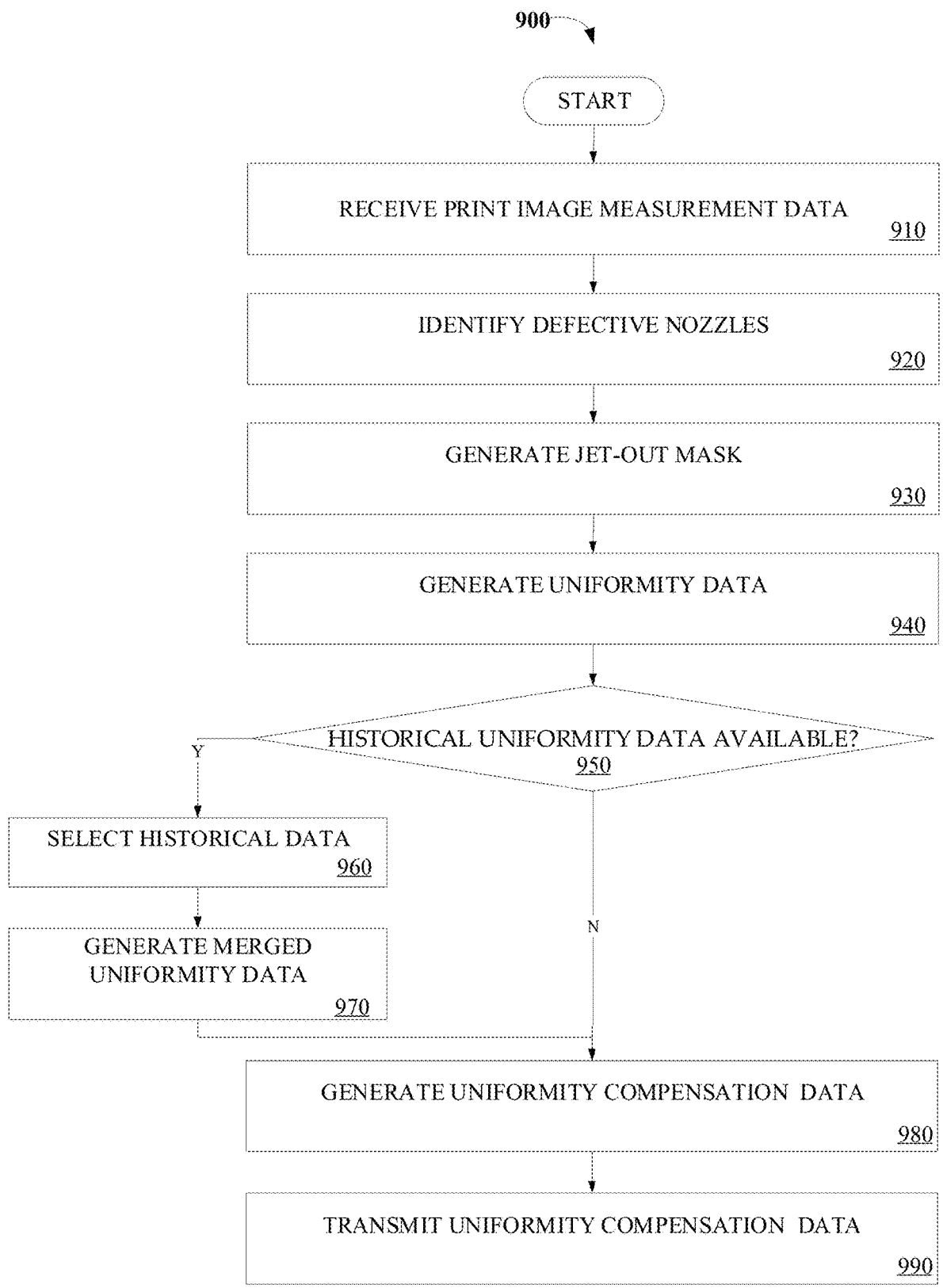
FIG. 9 is a flow diagram illustrating one embodiment of a uniformity compensation process performed by a printing system.

FIG. 9 is a flow diagram illustrating one embodiment of a process 900 for performing uniformity compensation. Process 900 may be performed by processing logic that may include hardware (e.g., circuitry, dedicated logic, programmable logic, microcode, etc.), software such as instructions run on a processing device, or a combination thereof. In one embodiment, process 900 is performed by uniformity compensation module 216.

At processing block 910, print image measurement data is received. At processing block 920, defective pel forming elements are detected in the measurement data by identifying defect regions in the measurement data associated with the defective pel forming elements. Alternatively, at processing block 920, defect region (e.g., position) data that identifies the defect regions is received separately from the measurement data. At processing block 930, one or more jet-out masks are generated for the identified defect regions. At processing block 940, uniformity data is generated based on the one or more jet-out masks. As discussed above, the uniformity data is generated by replacing the defect regions indicated by the jet out mask with replacement data, which is generated via a linear interpolation using data associated with neighbors of the defective pel forming elements.

In another embodiment, the uniformity data may be generated by adjusting to a value that, upon recovery, would continue to generate an even compensation with the neighbor pel forming elements that are now applying more ink to compensate. In yet another embodiment, the uniformity data may be generated by switching off the defective pel forming element until the neighboring pel forming elements have adjusted in instances in which the neighboring pel forming elements are able to fully compensate for the missing pel forming element.

At decision block 950, a determination is made as to whether historical sets of uniformity data are available. If so, one or more previously stored sets of uniformity data are selected from the historical sets of uniformity data via GUI 380, processing block 960. In one embodiment, historical sets of uniformity data are determined as available if they are identified as having metadata (e.g., paper type, print speed and/or the print resolution) matching metadata of the current uniformity data. At processing block 970, merged uniformity data is generated by combining the current uniformity with the selected set of historical uniformity data. As discussed above, weighting factors are applied to perform an averaging of the current uniformity data and the selected sets of uniformity data in order to generate the merged uniformity data.

Subsequently, or upon a determination at decision block 950 that no historical data is available, uniformity compensated data is generated, processing block 980. At processing block 990, the uniformity compensated data is transmitted (e.g., to printer 160 or calibration module 212).

Figure 10:
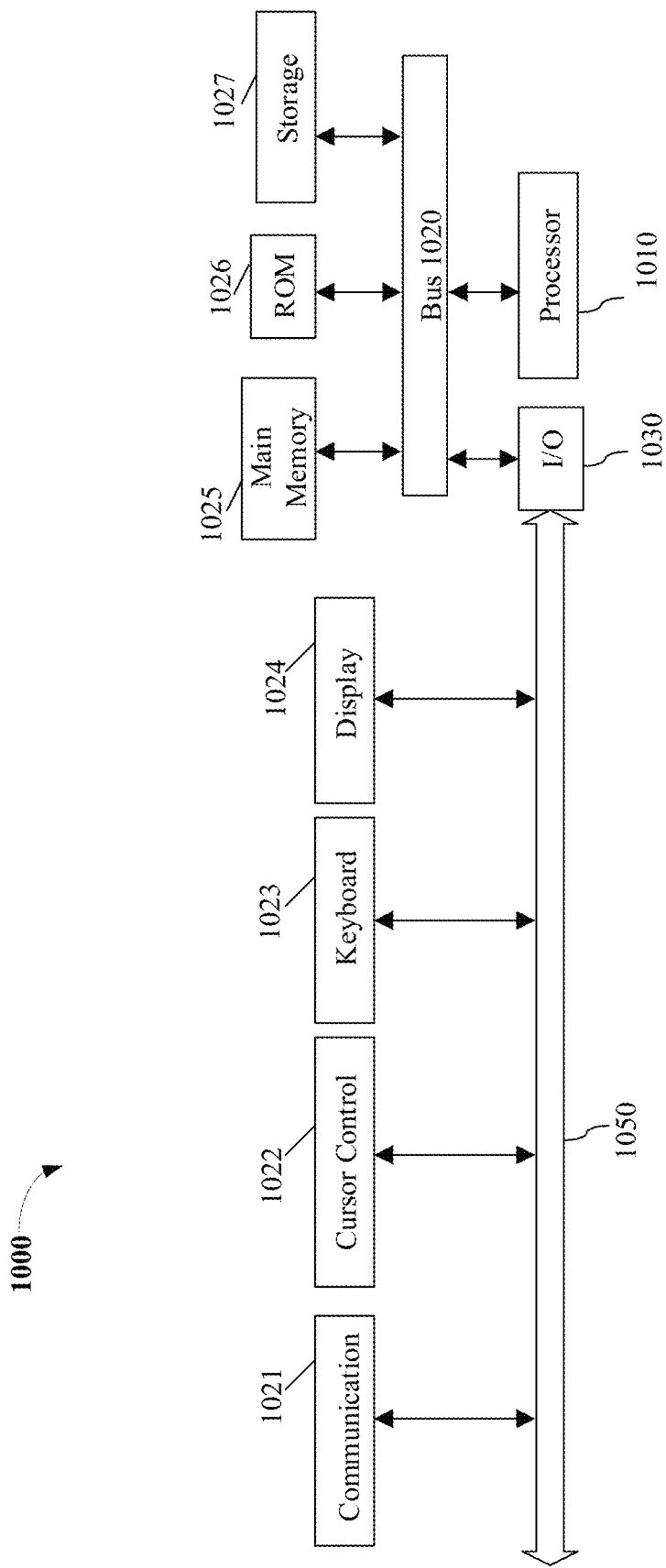
FIG. 10 illustrates one embodiment of a computer system.

FIG. 10 illustrates a computer system 1000 on which printing system 130 and/or uniformity compensation module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1027 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store uniformity compensation logic and one or more processors coupled with the at least one physical memory device to execute the uniformity compensation logic to receive first nozzle measurement data for each of a pel forming elements, identify a defect region in the first nozzle measurement data associated with one or more defective pel forming elements, generate a first jet out mask indicating the defect regions, replace the defect regions in the first nozzle measurement data with replacement data to generate first uniformity data and generate first uniformity compensation data based on the first uniformity data.

Example 2 includes the subject matter of Example 1, wherein the uniformity compensation logic further generates the replacement data associated with pel forming elements adjacent to the one or more defective pel forming elements.

Example 3 includes the subject matter of Examples 1 and 2, wherein generating the replacement data comprises performing a linear interpolation using measurement data.

Example 4 includes the subject matter of Examples 1-3, wherein the uniformity compensation logic further receives second nozzle measurement data for each of the pel forming elements, generate second uniformity data based on the second nozzle measurement data and generate merged uniformity data by combining the first uniformity data and the second uniformity data.

Example 5 includes the subject matter of Examples 1-4, wherein the uniformity compensation logic applies weights to the first uniformity data and the second uniformity data to generate a first weighted mask and a second weighted mask.

Example 6 includes the subject matter of Examples 1-5, wherein the first weighted mask and a second weighted mask are used as weighting factors to determine a weighted average of the first uniformity data and the second uniformity data.

Example 7 includes the subject matter of Examples 1-6, wherein the weighted average of the second uniformity data is greater than the weighted average of the first uniformity data.

Example 8 includes the subject matter of Examples 1-7, wherein the uniformity compensation logic determines whether additional defective pel forming elements have been identified in the second nozzle measurement data.

Example 9 includes the subject matter of Examples 1-8, wherein the uniformity compensation logic generates an ignore mask to remove data associated with the additional defective pel forming elements from the first uniformity data upon a determination that additional defective pel forming elements have been identified in the second nozzle measurement data.

Example 10 includes the subject matter of Examples 1-9, wherein the uniformity compensation logic generates first transfer functions corresponding to each of the pel forming elements based on the merged uniformity data.

Example 11 includes the subject matter of Examples 1-10, further comprising a printer, the printer comprising the pel forming elements.

Some embodiments pertain to Example 12 that includes at least one computer readable medium having instructions stored thereon, which when executed by one or more processors, cause the processors to receive first nozzle measurement data for each of a pel forming elements, identify a defect region in the first nozzle measurement data associated with one or more defective pel forming elements, generate a first jet out mask indicating the defect regions, replace the defect regions in the first nozzle measurement data with replacement data to generate first uniformity data and generate first uniformity compensation data based on the first uniformity data.

Example 13 includes the subject matter of Example 12, having instructions stored thereon, which when executed by one or more processors, further cause the processors to generate the replacement data associated with pel forming elements adjacent to the one or more defective pel forming elements.

Example 14 includes the subject matter of Examples 12 and 13, having instructions stored thereon, which when executed by one or more processors, further cause the processors to receive second nozzle measurement data for each of the pel forming elements, generate second uniformity data based on the second nozzle measurement data and generate merged uniformity data by combining the first uniformity data and the second uniformity data.

Example 15 includes the subject matter of Examples 12-14, having instructions stored thereon, which when executed by one or more processors, further cause the processors to apply weights to the first uniformity data and the second uniformity data to generate a first weighted mask and a second weighted mask, wherein the first weighted mask and a second weighted mask are used as weighting factors to determine a weighted average of the first uniformity data and the second uniformity data.

Example 16 includes the subject matter of Examples 12-15, having instructions stored thereon, which when executed by one or more processors, further cause the processors to determine whether additional defective pel forming elements have been identified in the second nozzle measurement data; and generate an ignore mask to remove data associated with the additional defective pel forming elements from the first uniformity data upon a determination that additional defective pel forming elements have been identified in the second nozzle measurement data.

Some embodiments pertain to Example 17 that includes a method comprising receiving first nozzle measurement data for each of a pel forming elements, identifying a defect region in the first nozzle measurement data associated with one or more defective pel forming elements, generating a first jet out mask indicating the defect regions, replacing the defect regions in the first nozzle measurement data with replacement data to generate first uniformity data and generating first uniformity compensation data based on the first uniformity data.

Example 18 includes the subject matter of Example 17, further comprising generating the replacement data associated with pel forming elements adjacent to the one or more defective pel forming elements.

Example 19 includes the subject matter of Examples 17 and 18, further comprising receiving second nozzle measurement data for each of the pel forming elements, generate second uniformity data based on the second nozzle measurement data and generating merged uniformity data by combining the first uniformity data and the second uniformity data.

Example 20 includes the subject matter of Examples 17-19, further comprising applying weights to the first uniformity data and the second uniformity data to generate a first weighted mask and a second weighted mask, wherein the first weighted mask and a second weighted mask are used as weighting factors to determine a weighted average of the first uniformity data and the second uniformity data.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

The invention claimed is:

1. A system comprising:
at least one physical memory device to store uniformity compensation logic; and
one or more processors coupled with the at least one physical memory device to execute the uniformity compensation logic to:
receive first nozzle measurement data for each of a pel forming elements;
identify a defect region in the first nozzle measurement data associated with one or more defective pel forming elements;
generate a first jet out mask indicating the defect regions;
replace the defect regions in the first nozzle measurement data with replacement data to generate first uniformity data; and
generate first uniformity compensation data based on the first uniformity data.

2. The system of claim 1, wherein the uniformity compensation logic further generates the replacement data associated with pel forming elements adjacent to the one or more defective pel forming elements.

3. The system of claim 2, wherein generating the replacement data comprises performing a linear interpolation using measurement data.

4. The system of claim 2, wherein the uniformity compensation logic further receives second nozzle measurement data for each of the pel forming elements, generate second uniformity data based on the second nozzle measurement data and generate merged uniformity data by combining the first uniformity data and the second uniformity data.

5. The system of claim 4, wherein the uniformity compensation logic applies weights to the first uniformity data and the second uniformity data to generate a first weighted mask and a second weighted mask.

6. The system of claim 5, wherein the first weighted mask and a second weighted mask are used as weighting factors to determine a weighted average of the first uniformity data and the second uniformity data.

7. The system of claim 6, wherein the weighted average of the second uniformity data is greater than the weighted average of the first uniformity data.

8. The system of claim 6, wherein the uniformity compensation logic determines whether additional defective pel forming elements have been identified in the second nozzle measurement data.

9. The system of claim 8, wherein the uniformity compensation logic generates an ignore mask to remove data associated with the additional defective pel forming elements from the first uniformity data upon a determination that additional defective pel forming elements have been identified in the second nozzle measurement data.

10. The system of claim 4, wherein the uniformity compensation logic generates first transfer functions corresponding to each of the pel forming elements based on the merged uniformity data.

11. The system of claim 1, further comprising a printer, the printer comprising the pel forming elements.

12. At least one computer readable medium having instructions stored thereon, which when executed by one or more processors, cause the processors to:
receive first nozzle measurement data for each of a pel forming elements;
identify a defect region in the first nozzle measurement data associated with one or more defective pel forming elements;
generate a first jet out mask indicating the defect regions;
replace the defect regions in the first nozzle measurement data with replacement data to generate first uniformity data; and
generate first uniformity compensation data based on the first uniformity data.

13. The computer readable medium of claim 12, having instructions stored thereon, which when executed by one or more processors, further cause the processors to generate the replacement data associated with pel forming elements adjacent to the one or more defective pel forming elements.

14. The computer readable medium of claim 13, having instructions stored thereon, which when executed by one or more processors, further cause the processors to:
receive second nozzle measurement data for each of the pel forming elements, generate second uniformity data based on the second nozzle measurement data; and
generate merged uniformity data by combining the first uniformity data and the second uniformity data.

15. The computer readable medium of claim 14, having instructions stored thereon, which when executed by one or more processors, further cause the processors to apply weights to the first uniformity data and the second uniformity data to generate a first weighted mask and a second weighted mask, wherein the first weighted mask and a second weighted mask are used as weighting factors to determine a weighted average of the first uniformity data and the second uniformity data.

16. The computer readable medium of claim 15, having instructions stored thereon, which when executed by one or more processors, further cause the processors to:
determine whether additional defective pel forming elements have been identified in the second nozzle measurement data; and generate an ignore mask to remove data associated with the additional defective pel forming elements from the first uniformity data upon a determination that additional defective pel forming elements have been identified in the second nozzle measurement data.

17. A method comprising:

receiving first nozzle measurement data for each of a pel forming elements;

identifying a defect region in the first nozzle measurement data associated with one or more defective pel forming elements;

generating a first jet out mask indicating the defect regions;

replacing the defect regions in the first nozzle measurement data with replacement data to generate first uniformity data; and generating first uniformity compensation data based on the first uniformity data.

18. The method of claim 17, further comprising generating the replacement data associated with pel forming elements adjacent to the one or more defective pel forming elements.

19. The method of claim 18, further comprising:

receiving second nozzle measurement data for each of the pel forming elements, generate second uniformity data based on the second nozzle measurement data; and generating merged uniformity data by combining the first uniformity data and the second uniformity data.

20. The method of claim 19, further comprising applying weights to the first uniformity data and the second uniformity data to generate a first weighted mask and a second weighted mask, wherein the first weighted mask and a second weighted mask are used as weighting factors to determine a weighted average of the first uniformity data and the second uniformity data.

* * * * *